United States Patent
Kolbe et al.

(10) Patent No.: US 9,450,920 B2
(45) Date of Patent: Sep. 20, 2016

(54) METHOD FOR PROVIDING ACCESS OF AN USER END DEVICE TO A SERVICE PROVIDED BY AN APPLICATION FUNCTION WITHIN A NETWORK STRUCTURE AND A NETWORK STRUCTURE

(75) Inventors: Hans-Joerg Kolbe, Darmstadt (DE); Mischa Schmidt, Heidelberg (DE); Martin Stiemerling, Leimen (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/381,393

(22) PCT Filed: Mar. 1, 2012

(86) PCT No.: PCT/EP2012/053489
§ 371 (c)(1),
(2), (4) Date: Aug. 27, 2014

(87) PCT Pub. No.: WO2013/127456
PCT Pub. Date: Sep. 6, 2013

(65) Prior Publication Data
US 2015/0101009 A1   Apr. 9, 2015

(51) Int. Cl.
*H04L 29/06* (2006.01)
*H04L 29/12* (2006.01)

(52) U.S. Cl.
CPC ..... *H04L 63/0281* (2013.01); *H04L 29/12518* (2013.01); *H04L 29/12528* (2013.01); *H04L 29/12547* (2013.01); *H04L 61/2571* (2013.01); *H04L 61/2575* (2013.01); *H04L 61/2582* (2013.01); *H04L 63/20* (2013.01)

(58) Field of Classification Search
USPC .................................... 726/1, 4, 7
See application file for complete search history.

(56) References Cited

U.S. PATENT DOCUMENTS 7,173,933 B1    2/2007  O'Rourke et al.
2009/0022477 A1*  1/2009  Petkovic et al. ............... 386/83

FOREIGN PATENT DOCUMENTS

WO    WO 2010028850 A1    3/2010
WO    WO 2010066295 A1    6/2010

OTHER PUBLICATIONS

"NGN Architecture: Generic Principles, Functional Architecture, and Implementation"; K Knightson, N Morita, T Towle; IEEE Communications Magazine, 2005, 8 pages.*

*Primary Examiner* — Jason Lee
(74) *Attorney, Agent, or Firm* — Leydig, Voit & Mayer, Ltd.

(57) ABSTRACT

For allowing a simple and reliable differentiation of UEs behind a GW from an AF side a method for providing access of an User End device (UE) to a service provided by an Application Function (AF) within a network structure is claimed, wherein the UE is authenticated by a Gateway (GW) to which the UE is attached and which provides access to the AF via a Broadband Access Network (BB Access Network). The method is characterized in that the GW informs a state database (SDB) on service flow requests to or from the authenticated UE towards the AF, that the GW additionally sends NAT (Network Address Translation) or NAPT (Network Address and Port Translation) binding information of a respective NAT or NAPT binding created by the GW regarding the authenticated UE and a respective service flow request to the SDB and that the SDB sends the NAT or NAPT binding information or an UE identifier to the AF, so that the AF—after having received the service flow request from the GW—can correlate the authenticated UE with the service flow request. Further an according network structure is claimed, preferably for carrying out the above mentioned method.

12 Claims, 5 Drawing Sheets

Figure 1:
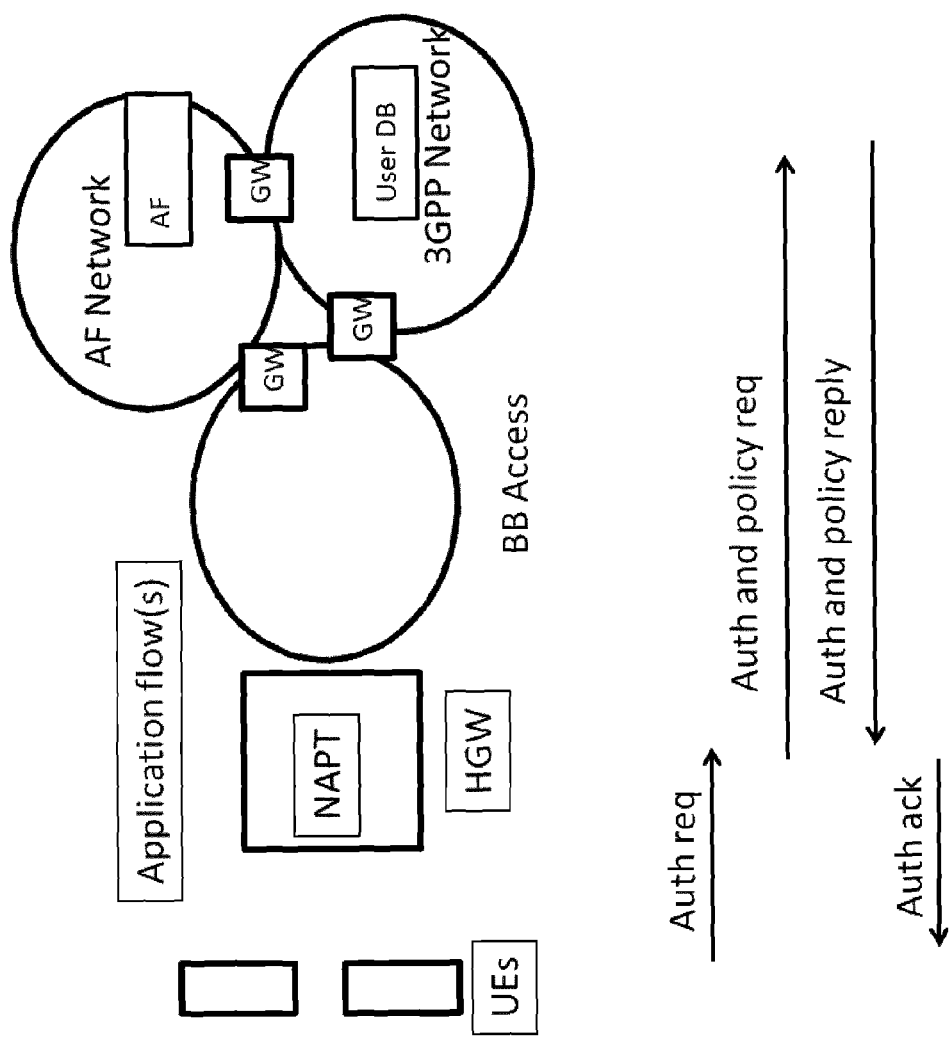

METHOD FOR PROVIDING ACCESS OF AN USER END DEVICE TO A SERVICE PROVIDED BY AN APPLICATION FUNCTION WITHIN A NETWORK STRUCTURE AND A NETWORK STRUCTURE

The present invention relates to a method for providing access of an User End device (UE) to a service provided by an Application Function (AF) within a network structure, wherein the UE is authenticated by a Gateway (GW) to which the UE is attached and which provides access to the AF via a Broadband Access Network (BB Access Network).

Further, the present inventions relates to a network structure, wherein access of an UE to a service provided by an AF within said network structure will be provided, wherein the UE is authenticated by a GW to which the UE is attached and which provides access to the AF via a BB Access Network.

In the following description the term "UE" is used for "User End device". However, with this used term "UE" also "User Equipments" of all kinds shall be covered by the invention.

Methods and network structures as mentioned above are known from today's practice. As a non limiting example the present invention is explained in the following with a GW that is arranged in the form of a Residential Gateway (RG), sometimes also referred to as "Home Gateway" (HGW).

While mobile networks identify mobile user end devices (UEs) by having them directly attach to networks, this is not given any more in fixed-line broadband access. In early 2000s, end devices, such as a single PC (Personal Computer) were running PPPoE/oA (Point-to-Point Protocol over Ethernet or over ATM) clients and attached directly to the network and the internet, obtaining a globally routable IP (Internet Protocol) address. With the introduction of RGs in order to allow multiple devices to have access to the Internet using the same access line, the RG took over the role as PPP termination point and served as default gateway for all devices inside the newly established home network. The home network uses in IPv4 deployments private IP addresses [RFC 1918] with only local significance and performs network address and port translation (NAPT) towards the Internet (or a further private network), efficiently hiding all devices behind one globally reachable IP address. Fixed line access greatly benefited from this immediate measure in terms of scalability, since sessions are now per access line and not per device. Having multiple smart phones attached to a single RG does not have any impact on the broadband networks scalability with regard to network access sessions. This is completely in contrast to the "per UE" approach of 3GPP. The issue is also present when the UEs behind the RG use IPv6 addresses instead of IPv4 addresses, with or without IPv6 NAT (Network Address Translation). With IPv6 NAT the issues are the same as with IPv4. Without an IPv6 NAT the address translation issues are void, but still the issue of using IPv6 addresses which are automatically created by the UE is presented. The device uses an IPv6 address which is not assigned by the RG, nor by the access network provider, as only an IPv6 prefix or prefixes are assigned to the RG, and any outside entity will not easily know which IPv6 address is assigned to what UE.

A major drawback is that the network does not have any knowledge about which UE is causing which TCP/IP flow. Especially as the NAPT mechanism of assigning TCP or UDP (User Datagram Protocol) ports can be random.

In standards and R&D, within the scope of fixed and mobile convergence (FMC), a new use case emerged: a 3GPP UE attaches to a local home network and this home network is attached to a fixed broadband access. By using IEEE 802.1x authentication, the RG can authenticate the UE and keep a state on the UE and the subscriber profile. The subscriber profile can be obtained by the RG—denoted RG for Residential Gateway in FIG. 1—from the 3GPP home service provider as depicted in FIG. 1.

In FIG. 1, UEs connect via the BB Access Network to an AF—AF being hosted generally speaking in another network denoted "AF Network"—for services.

Figure 2:
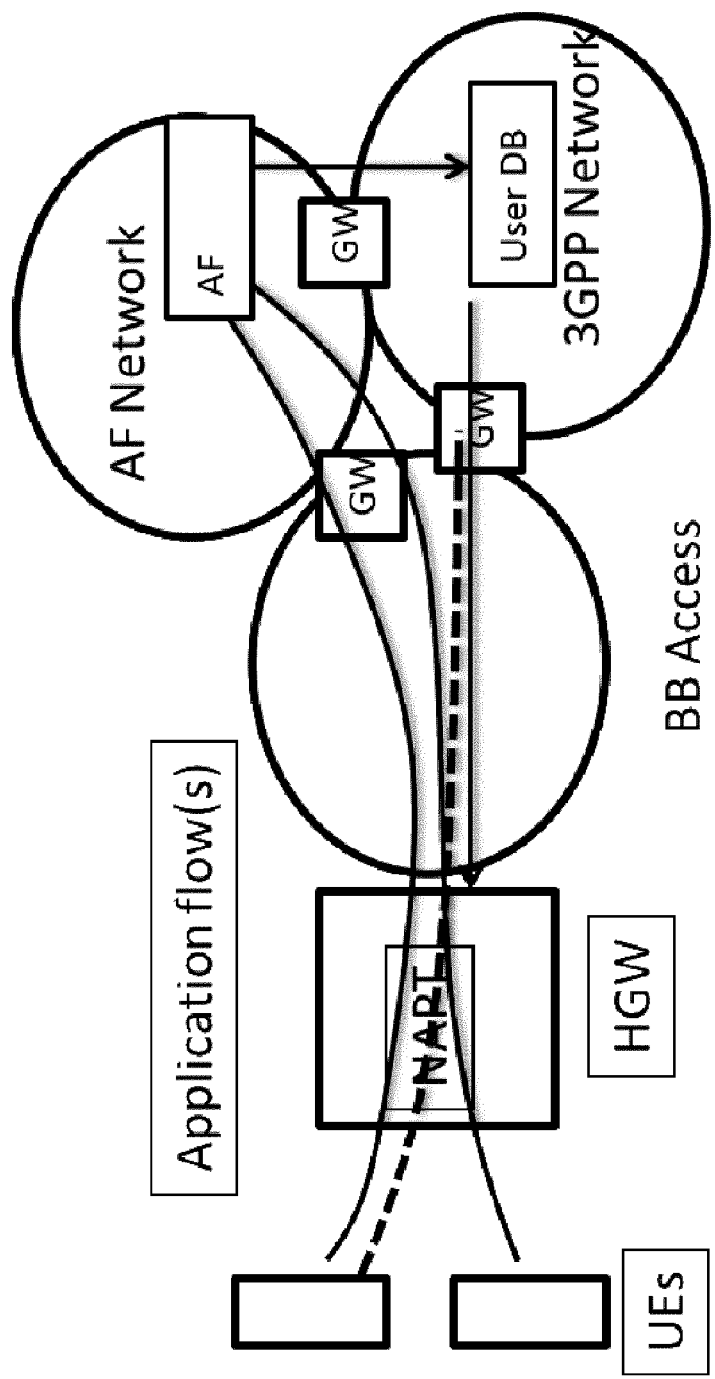

In the state of the art, all flows that the UE exchanges with the mobile network will be tunneled—dotted line in FIG. 2—and thus can easily be correlated with the UE since there is at least one tunnel per UE and the AF can query the 3GPP Network to identify the UE and the subscriber by means of this tunnel.

The interesting issue emerges when there is the situation of an UE's traffic offloaded to the routed home network toward the BB Access and an application connected to it. Those flows will go through the NAT of the RG towards the application used. Because of the random NAT rules there is no correlation with the UE possible. Flows from two UEs—solid line in FIG. 2—are indistinguishable at the AF side with regard to which UE originated them. Effectively, the home network structure topology is hidden by the NAT functionality in the RG.

One approach to circumvent this is reserving L4 port ranges for each UE and signaling this to the application and/or the 3GPP home network. But this has severe flaws with the management of such port ranges, especially in case the range is exceeded and how flows can then be managed.

A comparable problem statement is obtainable from "Analysis of Solution Candidates to Reveal a Host Identifier in Shared Address Deployments draft-boucadair-intarea-nat-reveal-analysis-04" http://datatracker.ietf.org/doc/draft-boucadair-intarea-nat-reveal-analysis/. A description of the functionality of NAT is obtainable from "Anatomy: A Look Inside Network Address Translators" http://www.cisco.com/web/about/ac123/ac147/archived_issues/ipj_7-3/anatomy.html.

It is an object of the present invention to improve and further develop a method for providing access of an UE to a service provided by an AF within a network structure and an according network structure for allowing a simple and reliable differentiation of UEs behind a GW from an AF side.

According to claim 1 the method is characterized in that the GW informs a state database (SDB) on service flow requests to or from the authenticated UE towards the AF, that the GW additionally sends NAT or NAPT binding information of a respective NAT or NAPT binding created by the GW regarding the authenticated UE and a respective service flow request to the SDB and that the SDB sends the NAT or NAPT binding information or an UE identifier to the AF, so that the AF—after having received the service flow request from the GW—can correlate the authenticated UE with the service flow request. Instead of the actual binding, also the direct UE information, e.g. an ID, can be sent from the SDB to the AF According to claim 37 the network structure is characterized in that the GW comprises means for informing a state database (SDB) on any service flow request to or from the authenticated UE towards the AF, that the GW additionally comprises means for sending NAT or NAPT binding information of a respective NAT or NAPT binding created by the GW regarding the authenticated UE and a respective service flow request to the SDB and that the SDB comprises means for sending the NAT or NAPT binding information or an UE identifier to the AF, so that the AF—after having received the service flow request from the GW—can correlate the authenticated UE with the service flow request.

According to the invention it has been recognized that the above object can be accomplished in a very easy way by simply implementing an SDB which will be informed by the GW on any service flow request to or from the authenticated UE towards the AF. Concretely, the GW will additionally send NAT or NAPT binding information regarding the authenticated UE and a respective service flow request to the SDB and the SDB will send the NAT or NAPT binding information or UE identifier further to the AF. After having received the service flow request from the GW the AF now can correlate the authenticated UE with the service flow request on the basis of said NAT or NAPT binding information or of the UE identifier. By this procedure a simple and reliable differentiation of UEs behind a GW can be performed from the AF side.

On the basis of said performed correlation—if successful—the AF could execute different favorable procedures. Within a preferred embodiment the AF could allow the requested service or session to be set up. Alternatively or additionally the AF could start an accounting procedure regarding performed traffic, for example, or apply any previously specified policy or could allow specific policies to become applied to the requested service usage or service flow by the UE.

Within a further preferred embodiment the AF could provide traffic to the authenticated UE depending on at least one definable parameter. Advantageously, the parameter could comprise priority and/or quality and/or content of the traffic. If a subscriber is qualified as premium subscriber traffic could be provided with high priority to the respective UE. Alternatively or additionally identical content could be provided in higher quality if the subscriber is a premium subscriber or the premium subscriber could get additional—premium—content or services.

Within a further preferred embodiment—on the basis of the correlation—the AF could provide services and/or content to the authenticated UE without requiring a login from a subscriber of the authenticated UE if the SDB additionally to the NAT or NAPT binding information sends login/authentication data to the AF. In this case a very simple access to a service could be performed, where it is sufficient to identify a device for the access.

With regard to a simple authentication the GW could authenticate the UE by exchanging information with an entity (UDB) that contains the user database and the profile. For simplification all these functions could be realized within said entity.

Within a preferred embodiment the GW could receive a policy that instructs it to inform the SDB on said service flow requests or a specified subset of service flow requests together with an authentication reply from the above entity. Such a policy could contain the instruction to reserve further ports for subsequent flows to the respective destination, for example an IP sub-network.

Within another preferred embodiment the SDB could request the GW to reserve multiple ports for a certain UE for future NAT or NAPT mappings.

With regard to a very effective differentiation of UEs behind a GW the NAT or NAPT binding information could comprise an UE identifier (ID) agreed with an SDB owner.

Within a further preferred embodiment the GW could forward the service flow request to the AF while in parallel the SDB sends the NAT or NAPT binding information to the AF. Alternatively, for avoiding inconsistencies the GW could send the service flow request to the AF after the AF has informed the GW that it has received the NAT binding information from the SDB. In this way a high degree of synchronicity could be reached.

Within a further preferred embodiment the GW could add additional information to a data flow from the UE to the AF. Preferably, the data flow could be a TCP/IP (Transmission Control Protocol/Internet Protocol) flow. Regarding a very reliable differentiation of UEs the additional information could be an authentication token or an UE ID. Advantageously, the additional information could be used by the AF to query the SDB to find out information needed for a service delivery. Thus, a very reliable service delivery could be performed.

With regard to a high degree of maintenance the SDB could query the GW in intervals whether the UE is still connected to the GW. This could be performed by appropriate messages to the GW.

Further, the SDB could query the GW for other UE related NAT or NAPT bindings being active at the GW.

If the authentication mechanism used to authenticate the UE at the GW supports it, the SDB could require an UE re-authentication by sending an appropriate message to the GW. In this way, the authentication status could be updated.

Within a further preferred embodiment the SDB could instruct the GW to close NAT or NAPT bindings, if a subscription is revoked. Accordingly, the SDB could inform the AF of a revoked subscription.

Within another preferred embodiment the GW could inform the SDB of changed NAT or NAPT bindings. Accordingly, the SDB could inform AFs regarding changed NAT or NAPT bindings.

Within a further preferred embodiment the GW could inform the SDB, if an UE disconnects from the GW. Accordingly, the SDB could inform AFs regarding disconnected UEs.

Regarding a high degree of security within the network structure the AF could be authenticated during its registration according to a business level agreement. Such a business level agreement could be performed between the parties operating entities within the network structure.

Depending on the individual network structure a communication between the GW and the SDB could be performed directly or indirectly.

Within a further preferred embodiment the authenticated UE could transfer its access rights to another UE being attached to the same GW but not having performed an authentication procedure. In other words, an authenticated device could make a different device for example in the same local home network become part of its authentication group.

Concretely, the authenticated UE could send a massage via an authentication channel to the GW to bundle both UEs with regard to identification. Preferably, the sending of said message could be performed after having performed a pairing procedure with the other UE, for example using a local exchange with bluetooth.

Within a further preferred embodiment two or more NATs or NAPTs could be realized in a cascaded arrangement. Preferably in such a case, at least a second NAT or NAPT could be located in the BB Access Network.

Within a further preferred embodiment the method could use the same framework in setup with or without NAT or NAPT when UEs use IPv6 addresses with dynamically changing host part.

Within a further preferred embodiment the signaling between SDB and the GW could be done via the network attachment channel/protocol such as PPPoE or 3GPP GAA/GBA or a AAA protocol such as Radius or Diameter.

A further preferred embodiment of a network structure could comprise means to allow a secondary unauthenticated UE's traffic being reported to the BB Access Network as belonging to an authenticated UE's traffic based on a local pairing of both UEs.

This invention provides a means to include UE identifiers without using pre-assigned NAT or NAPT port ranges or "hacking" transport protocols. Beyond applicability to FMC use cases, this invention provides device identification that has big benefits towards a single sign on use cases where it is sufficient to identify a device to access a service. As an example: currently, when using PCs that are not authenticated at the network, for each service accessed (facebook, Google, etc) the user needs to type in username and password. Our approach allows that the service accessed (e.g. facebook in this example) can authenticate the service request by querying the User DB to which the user's RG or GW authenticated already.

This invention is compatible with State of the Art single-sign on technologies using e.g. SAML (Security Assertion Markup Language) technology, where the user actively authenticates towards an authentication provider which then passes user authentication information to the service requested:
a) The User DB shown in FIG. 2 could provide SAML tokens of authentication to the services requested.
b) The User DB shown in FIG. 2 could provide authentication information to the authentication provider which then passes SAML tokens of authentication to the services requested.

Important aspects of the invention are:
1) A method to associate packet data flows with devices attached to a network at a point in the network that is achieved by transferring data from entities that are aware of the mapping between protocol fields and the device identity.
2) An implementation when using NAT or NAPT by using a sub-fraction of the NAPT-devices' NAT table transferred according to provisioned filtering rules to a broker entity that informs the AF.
3) An implementation when using IPv6 with changing host identifiers using same transfer mechanism as with NAT or NAPT.
4) An implementation where a management system instructs the responsible node to transfer packet data flow correlation information only when the packet data flow or device identity match a specific criteria.
5) A method to correlate device identity and packet data flow with an authentication that had been performed at device attachment phase or later.
6) A means to allow a secondary unauthenticated device's traffic being reported to the network as belonging to an authenticated device's traffic based on a local pairing of both devices.
7) A means/An implementation where the signaling between SDB and RG or GW is done via the network attachment channel/protocol such as PPPoE or 3GPP GAA/GBA.
8) An implementation where the SDB may request to reserve multiple ports for a certain device for future NAT or NAPT mappings, resulting in reduced signaling needs.
9) Adding further information about a device in the network, e.g., at the RG, for instance, by adding a TCP option.

The present invention allows device identification for applications accessible through a NAT or NAPT and a seamless functionality for devices. Further, the invention allows authentication and/or charging for web-services without user involving authentication mechanisms such as user name/password schemes at the service. A delegation of authorizations from the UE is also possible, e.g. for plain Internet-TV. No protocol hacks are necessary. Further, the invention is applicable also to deployments without any NAT or NAPT or variants, such as Carrier Grade NATs (CGNs). On the basis of the present invention no protocol changes on UEs are necessary.

Figure 3:
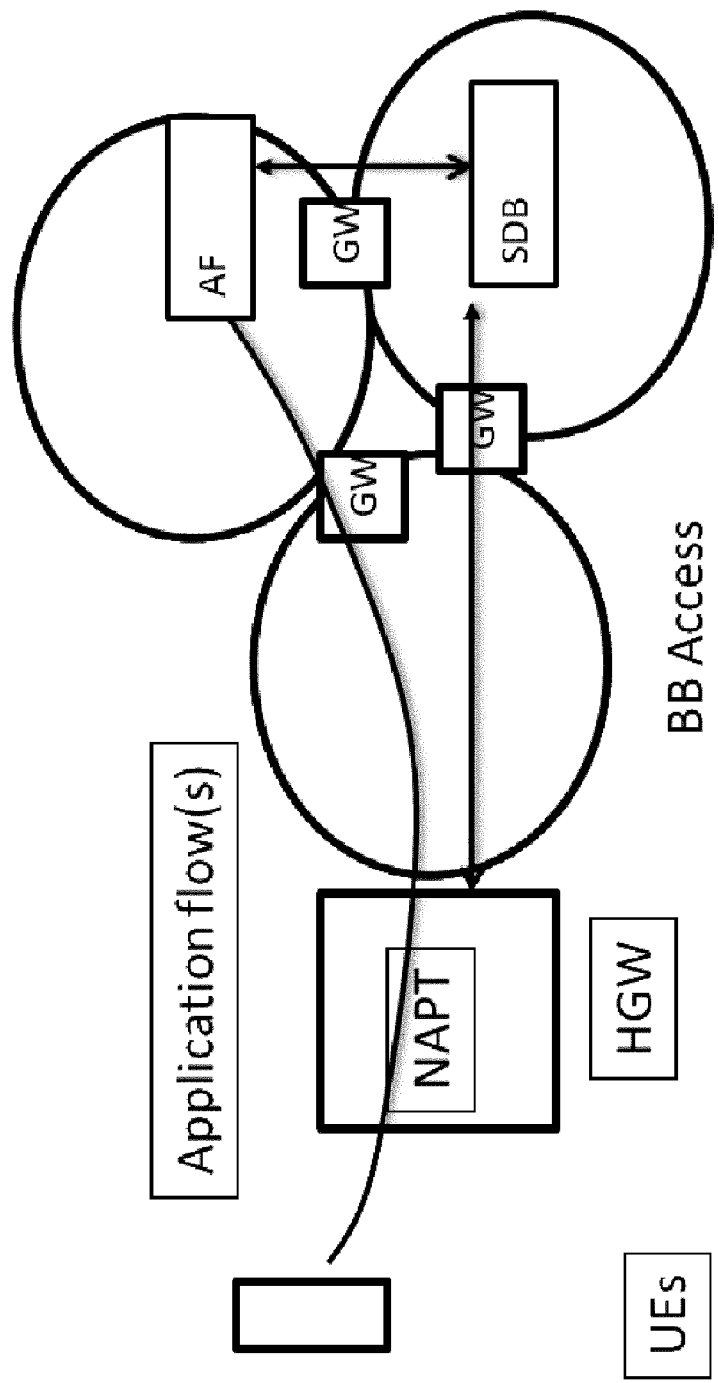
Figure 4:
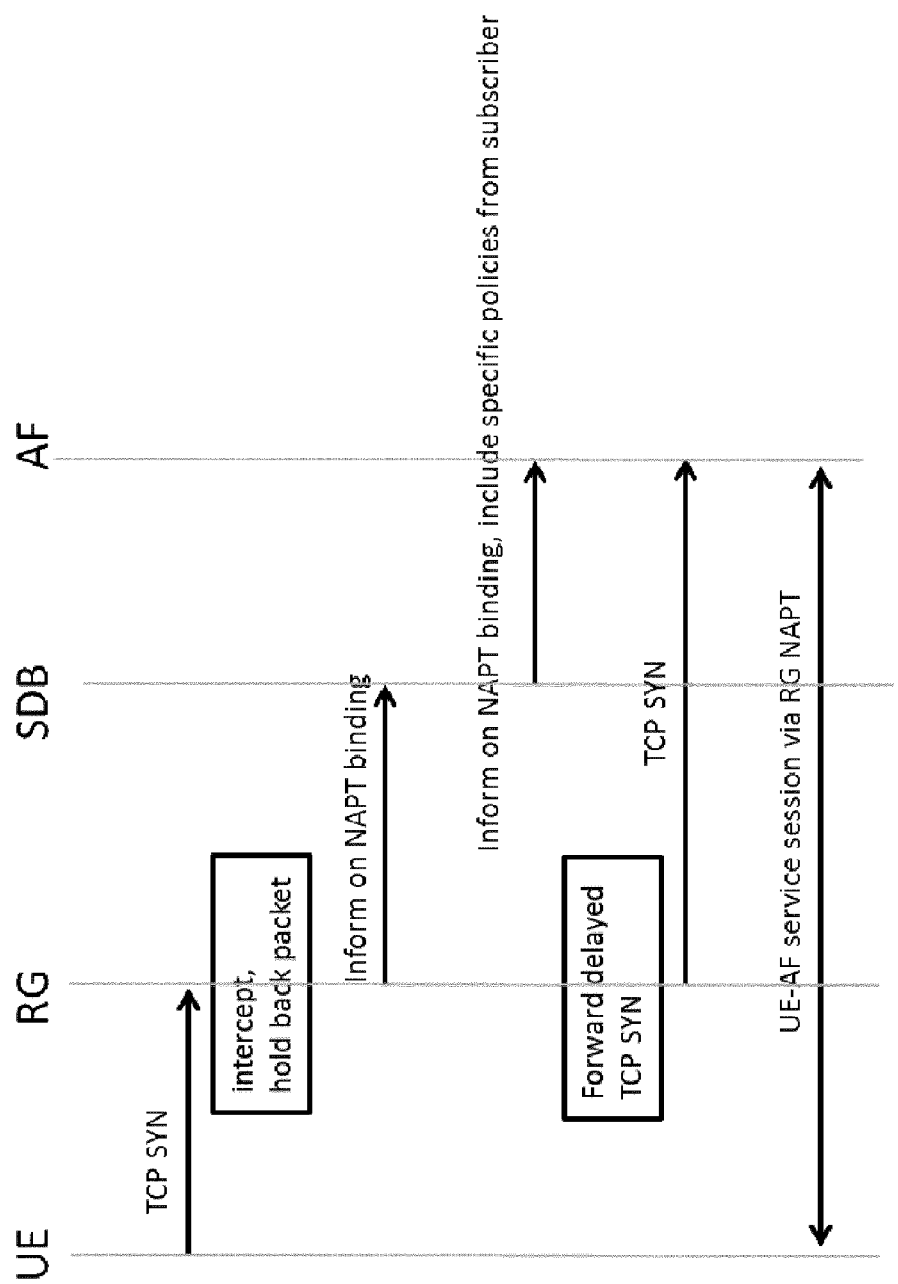
Figure 5:
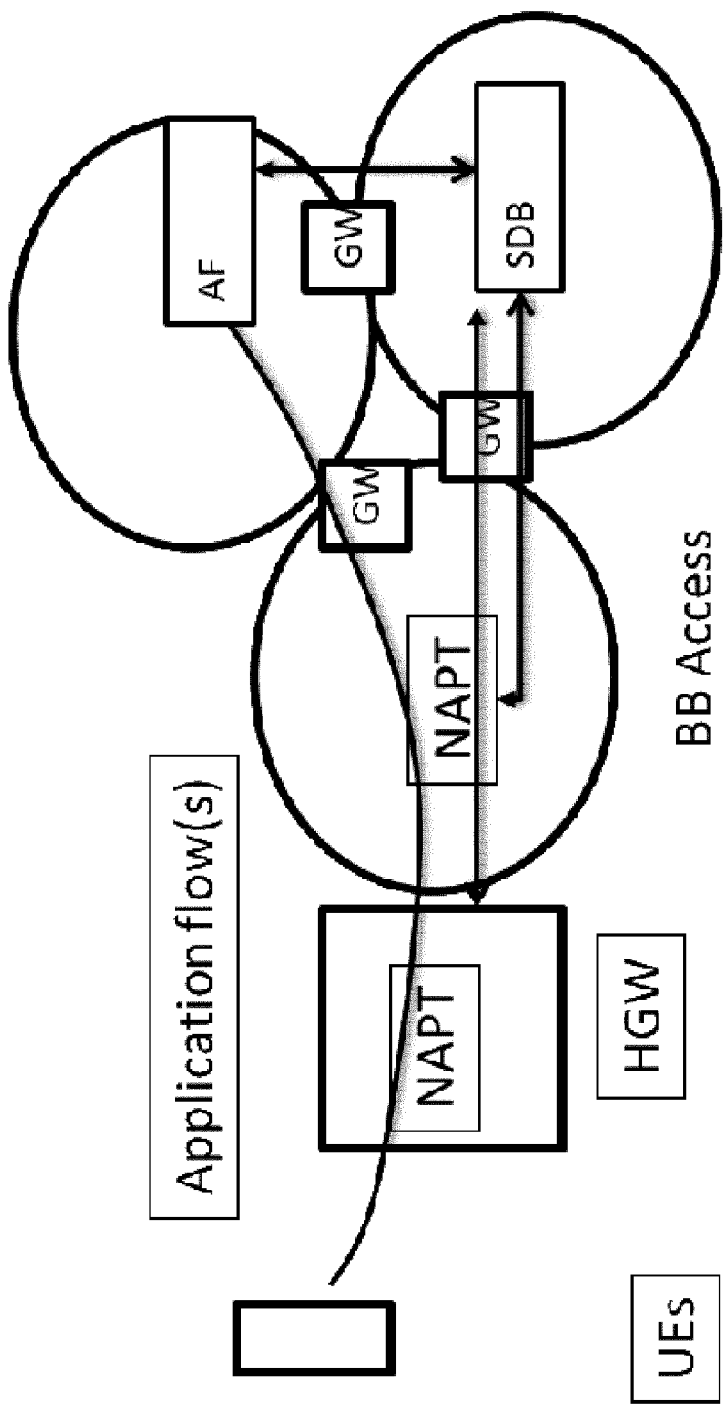

There are several ways how to design and further develop the teaching of the present invention in an advantageous way. To this end it is to be referred to the patent claims subordinate to patent claim 1 on the one hand and to the following explanation of preferred examples of embodiments of the invention, illustrated by the drawing on the other hand. In connection with the explanation of the preferred embodiments of the invention by the aid of the drawing, generally preferred embodiments and further developments of the teaching will we explained. In the drawings FIG. 1 is showing, schematically, a known network structure where an UE has been authenticated by a RG, FIG. 2 is showing, schematically, a network structure illustrating the exchange of flows between an UE and a mobile network via tunnel mechanism, FIG. 3 is showing, schematically, a network structure according to an embodiment of the present invention comprising an SDB, FIG. 4 is showing, schematically, a session establishment proceeding according to the invention and FIG. 5 is showing, schematically, a network structure, where two NAPTs are cascaded.

In the following preferred embodiments of the present invention are explained, wherein the GW, which authenticates the UEs, is realized as an RG.

Within the first embodiment the RG authenticates an UE by exchanging information with the entity that contains the user database and the profile. For simplicity, without limiting the concept of this invention, we put all these functions into the entity UDB. This procedure can be implemented e.g. by some enhanced 802.1x procedure as currently discussed in standards (Broadband Forum).

Important features of the embodiment are:
a) Setup

With the authentication reply, the RG receives additionally a policy that instructs it to inform a novel entity SDB (state database) on any IP flow request to or from the UE towards an AF residing in a subnet e.g. classified by an accompanying access control list. Such a policy could contain

| Subnet | action |
|---|---|
| 145.253.2.1 | inform |
| 92.5.67.0/24 | reserve 10, inform |

While the first entry instructs the RG to inform the SDB immediately if a new flow is to be set up with host 145.253.2.1, the second line instructs it to reserve 10 ports in case a flow is set up with the remaining 9 ones to be used for subsequent flows to the specified destination (in this case an IP sub-network).

b) Operational Mode

Having installed the policies, the action is performed as shown within FIG. 3 and FIG. 4.

In case the RG observes a session establishment packet, e.g. a TCP SYN packet from an UE it knows—one that has authenticated prior to sending this packet in any way, e.g. using the aforementioned 802.1x schemes—, it holds back this packet, creates the NAT binding, checks if it matches the criteria defined by the policy, e.g. destination address, and then sends an inform packet to the SDB with information on the NAT binding it has created. Example:

TCP src port 32168 dest port 80 dest 145.253.2.1 device=Frank's IPhone (for the multiple port policy it could be as follows:

TCP src port 32169-79 dest port 80 dest 92.5.67.1 device=Johnny's IPhone)

The device ID can be any identifier agreed with the SDB owner, e.g. also an IMSI (International Mobile Subscriber Identity) or parts thereof.

As next step, the RG forwards the session establishment packet towards the AF while in parallel the SDB informs the AF. In a beneficial variation of the mechanism, if synchronicity is desired, the RG only forwards the AF session establishment packet towards the AF after the AF informed the RG that it received the SDB information—this way no race conditions and state inconsistencies can arise.

In another embodiment, the RG may add additional information to the data flow from the UE to the AF, where this data flow may be a TCP/IP flow. This additional information can be an authentication token or UE ID. This information is then used by the AF to query the SDB to find out any information needed for the service delivery, such as, if the user is allowed to access it. One possible way of adding this information is, if TCP is used, to add a TCP option to the TCP header where the option contains the authentication token or UE ID. This is similar to what [draft-boucadir]—see the first reference cited at the beginning of this application document—is proposing but it relies on the fact that the option is inserted by the terminal, whereas we add this in the RG.

The AF can now correlate the incoming TCP SYN with the device information and can execute procedures such as Allow the session to be set up Start accounting provide traffic to this particular UE differently, e.g. with priority as the subscriber might be a premium subscriber Offer additional or premium content or services to the UE or identical content in higher quality if the subscriber is a premium subscriber Provide services and content to the UE without requiring a login from the subscriber of the UE as the SDB information provided login/authentication data to the AF a) Maintenance The SDB can query RG in intervals whether the UE is still connected to the RG by appropriate messages.

The SDB can query the RG for another UE related NAPT bindings active at the RG.

If the authentication mechanism used to authenticate the UE at the RG supports it, the SDB may require an UE re-authentication by sending an appropriate message to the RG.

The SDB can instruct the RG to close the NAPT bindings if the subscription is revoked. The RG might ignore this instruction. In either case the SDB also informs the AF of the revoked subscription.

If the NAPT bindings on the RG associated to the authenticated UE change, the RG informs the SDB with appropriate messages (either containing all UE related NAPT bindings or only updated NAPT bindings). The SDB can inform all AFs indicated of being affected.

If the UE disconnects from the RG, the RG informs the SDB of this by an INFORM LEAVE message. The SDB informs all AFs it informed about the UE before.

b) Control Channels

To enable this, the SDB or an intermediate entity needs to communicate with the AFs. This needs to include an authentication of the AF during its registration according to the business level agreement between the parties operating the entities.

The communication between the SDB and the RG can be directly or indirectly. As examples, the following methods can be used Inline signaling in PPPoE (enhanced protocol between BRAS (Broadband Remote Access Server) and RG on PPP control level)

Using explicit AAA signaling such as Radius or Diameter protocols

Using SIP (Session Initiation Protocol) and having the RG register to the SIP server first (using a framework from WO 2010/028850 A1, HRACS).

Another standardized or proprietary protocol on top of IP, within of IP, or below IP.

e) Identification Transfer

In an enhanced embodiment, an authenticated device can make a different device in the same local home network become part of its authentication group. In this case, the allowance to join the authentication group could be, e.g., transferred from a mobile phone to a laptop PC allowing the PC to access the same services without having the user or device to go through an authentication procedure. This would, e.g., allow to transfer rights in a visited network to a device there, e.g. a TV can play out a multimedia stream using the identity of the visiting mobile phone. A procedure could be as follows:

An UE arrives at the network and authenticates itself, thus, the UE is known at RG.

The UE "bonds" with another device in a sense that, e.g., both connect via Bluetooth or the UE reads a QR code from the screen of the other device including information on IP/MAC address of the other device.

The UE sends a message via the authentication channel to the RG to bundle those two devices with regard to identification. The RG then treats session setup related requests from the other device as if they were from the UE resulting in interactions with the SDB. Additionally, the RG may indicate an indicator that not the UE but another device and optionally also the device's attributes and/or type and/or unique identifier—such as product and manufacture codes—to the SDB.

The SDB might relay this information, if available, to the AF as the AF might take this information into account in service delivery, e.g. for offered content resolution.

In an enhanced embodiment of this delegation scenario, the AF hosted service tries to charge the UE, the SDB may use a special message to inform the UE via the RG that charging will occur. This message may require a confirmation of the UE in order to authenticate the charging.

Now, if the other device starts any flows, e.g., TCP or UDP or DCCP (Datagram Congestion Control Protocol), but not limited to, when matching the policy rules in the RG, the UEs ID gets appended by the RG in the signaling to the AF. This can be done for instance, by using the above mentioned usage of the TCP option to add the additional information about UE or in what name of an UE is being asked, e.g., if it is the TV set.

While our invention contains examples on IPv4 technology, IPv6 is supported if mechanisms similar to NAPT are used on the RG. Even if in the IPv6 case, NAPT technology is not used at the RG, if the UE is authenticated at the RG, the RG can follow the principles of this invention and thus is subject to it: The RG delays the session setup signaling such as TCP SYN in order to inform the SDB of the UE identifier and the destination AF address or adds the additional information to the data flows. The SDB then can inform the AF and the AF can use the SDB information for authentication, policing etc.

Even in the case when no NAT or NAPT is being used for IPv6, the RG still needs to know which IPv6 address is being used by the UE. Typically, UE's learn the routing prefix, i.e., the first 64 bit of the IPv6 address, by DHCPv6 or Router Advertisements (RA) and construct the remaining 64 bit, i.e., the host identification part on their own based on their L2 identifier, for instance, the Ethernet MAC-address. A simple way of assigning IPv6 addresses which are completely generated by the RG is using DHCPv6. However, in most cases, the UE will assign the host identifier on its own, so that it is not immediately clear to any AF which IPv6 address is bound to which UE. Or even to which of the UE's interfaces, if the UE has many interfaces which are connected to the RG. This host part generated by the UE might also use Cryptographically Generated IPv6 Addresses (CGA). Furthermore, a UE might decide to use multiple IPv6 addresses at the same time and pick one or the other IPv6 address when starting a new communication with a remote host.

In a chained environment, where the packets get routed through e.g., two or more NATs that are cascaded, the invention is still applicable. While only the NAT element where the device has attached to can correlate device identity and packet flow with changed ports/addresses, it is still possible to re-built the chain by having the intermediate nodes report their NAT mapping in the same way to the SDB. Similar filtering rules may apply, as the only not available information is the device identity. The SDB can then put the pieces together to learn the flow parameters to be sent to the AF. FIG. 5 illustrates an environment where a second NAPT is located in the BB Access Network.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for providing a User End device (UE) with access to a service provided by an Application Function (AF) via a network, the method comprising:
   authenticating the UE by a gateway to which the UE is attached;
   obtaining, by the gateway, a service flow request from the UE, wherein the gateway adds additional information to the service flow request;
   creating, by the gateway, a Network Address Translation (NAT) or Network Address and Port Translation (NAPT) binding for the UE;
   sending, by the gateway, information on the created NAT or NAPT binding to a state database (SDB), wherein the SDB is on a separate network from the network used by the AF to provide the service to the UE;
   sending, by the SDB, the information on the created NAT or NAPT binding, or a UE identifier corresponding to the information on the created NAT or NAPT binding, to the AF;
   forwarding, by the gateway, the service flow request to the AF via the network;
   correlating, by the AF, the service flow request with the UE based on the information on the created NAT or NAPT binding, or the UE identifier corresponding to the information on the created NAT or NAPT binding, from the SDB; and
   configuring, by the AF, in response to the correlating, a service flow corresponding to the service flow request with the UE for providing the service, wherein the configuring includes at least one of the following: (a) allowing the service to be set up, (b) allowing specific policies to be applied to the service, and (c) starting an accounting procedure.

2. The method according to claim 1, further comprising:
   based on the correlating, providing, by the AF, traffic to the UE based on at least one definable parameter.

3. The method according to claim 1, wherein the configuring includes providing the service to the authenticated UE without requiring a login from a subscriber corresponding to the UE if the SUB sends login/authentication data to the AF.

4. The method according to claim 1, wherein the gateway authenticates the UE by exchanging information with an entity that contains a user database and a profile.

5. The method according to claim 4, wherein with an authentication reply from the entity, the gateway receives a policy that instructs the gateway to inform the SDB regarding the service flow request.

6. The method according to claim 1, wherein forwarding the service flow request to the AF via the network is performed by the gateway after the AF has informed the gateway that the AF has received the information on the created NAT or NAPT binding, or the UE identifier corresponding to the information on the created NAT or NAPT binding, from the SDB.

7. The method according to claim 1, wherein the additional information is used by the AF to query the SDB to find out information needed for the service flow.

8. The method according to claim 1, wherein the SDB queries the gateway for NAT or NAPT bindings relating to other UEs attached to the gateway.

9. The method according to claim 1, wherein the AF is authenticated during its registration according to a business level agreement.

10. The method according to claim 1, wherein the UE transfers its access rights to another UE attached to the same gateway not having performed an authentication procedure.

11. The method according to claim 10, wherein the UE sends a message via an authentication channel to the gateway to bundle both UEs with regard to the UE identifier.

12. A network system, wherein access to a service provided by an Application Function (AF) is provided to a User End device (UE) via a network, wherein the network system comprises:
- a gateway to which the UE is attached, configured to:
  - authenticate the UE;
  - obtain a service flow request from the UE, wherein the gateway is configured to add additional information to the service flow request;
  - create a Network Address Translation (NAT) or Network Address and Port Translation (NAPT) binding for the UE;
  - send information on the created NAT or NAPT binding to a state database (SDB);
  - forwarding, by the gateway, the service flow request to the AF via the network;
- the SDB, configured to send the information on the created NAT or NAPT binding, or a UE identifier corresponding to the information on the created NAT or NAPT binding, to the AF, wherein the SDB is on a separate network from the network used by the AF to provide the service to the UE;
- the AF, configured to:
  - correlate the service flow request with the UE based on the information on the created NAT or NAPT binding, or the UE identifier corresponding to the created NAT or NAPT binding information, from the SDB; and
  - configure, in response to the correlating, a service flow corresponding to the service flow request with the UE for providing the service, wherein the configuring includes at least one of the following: (a) allowing the service to be set up, (b) allowing specific policies to be applied to the service, and (c) starting an accounting procedure.

* * * * *